(12) United States Patent
Ramaswamy et al.

(10) Patent No.: US 9,112,720 B2
(45) Date of Patent: Aug. 18, 2015

(54) SYSTEM AND METHOD FOR PROVIDING MULTIMEDIA SERVICES

(75) Inventors: Veeru N. Ramaswamy, Jackson, NJ (US); Franklyn Athias, Cherry Hill, NJ (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 0 days.

(21) Appl. No.: 13/485,570

(22) Filed: May 31, 2012

(65) Prior Publication Data

US 2012/0240201 A1 Sep. 20, 2012

Related U.S. Application Data

(63) Continuation of application No. 11/238,724, filed on Sep. 29, 2005, now Pat. No. 8,213,412.

(51) Int. Cl.
*H04L 12/66* (2006.01)
*H04L 12/28* (2006.01)
*H04L 29/06* (2006.01)

(52) U.S. Cl.
CPC ........ *H04L 12/2856* (2013.01); *H04L 65/1073* (2013.01); *H04L 65/1036* (2013.01)

(58) Field of Classification Search
CPC ............ H04L 12/2856; H04L 65/1073; H04L 65/1036
USPC .................................. 370/352; 709/219, 227
See application file for complete search history.

(56) References Cited

U.S. PATENT DOCUMENTS

| | | | | |
|---|---|---|---|---|
| 7,483,996 | B2* | 1/2009 | Townsley et al. | 709/236 |
| 8,381,273 | B2* | 2/2013 | White et al. | 726/5 |
| 2004/0221045 | A1* | 11/2004 | Joosten et al. | 709/227 |
| 2005/0108423 | A1* | 5/2005 | Centemeri | 709/237 |
| 2005/0188200 | A1* | 8/2005 | Kwok | 713/168 |
| 2006/0120348 | A1* | 6/2006 | Croak et al. | 370/352 |
| 2006/0209891 | A1* | 9/2006 | Yamada et al. | 370/468 |
| 2007/0011329 | A1* | 1/2007 | Albert et al. | 709/226 |
| 2009/0022152 | A1* | 1/2009 | Henry et al. | 370/389 |

* cited by examiner

*Primary Examiner* — Sonia Gay
(74) *Attorney, Agent, or Firm* — Ballard Spahr LLP

(57) ABSTRACT

A communications system and method is configured to provide multimedia services utilizing a signaling protocol such as a session initiated protocol (SIP), via a local access network. The method includes providing a local proxy having an internet protocol (IP) address, wherein the local proxy is integrated with the local access network. The method further includes providing a client device having a signaling protocol client, wherein the client device is coupled to a remote access network that is, external to the local access network. Additionally, the method includes initiating a session by the client device accessing the IP address of the local proxy.

20 Claims, 3 Drawing Sheets

SYSTEM AND METHOD FOR PROVIDING MULTIMEDIA SERVICES

CROSS REFERENCE TO RELATED PATENT APPLICATION

This application is a continuation of U.S. application Ser. No. 11/238,724, filed Sep. 29, 2005, hereby incorporated herein by reference in its entirety.

BACKGROUND OF THE INVENTION

1. Field of the Invention

The present invention relates generally to a system and method for providing multimedia services utilizing a local proxy via a signaling protocol such as session initiation protocol (SIP).

2. Background Art

Session initiation protocol (SIP) is a signaling protocol commonly used by communications service providers to provide multimedia services such as voice over IP, instant messaging, video sharing/streaming and chat' services. A conventional SIP architecture includes a core SIP network connected to an edge network (also referred to as a local access network). The core SIP network, that provides the multimedia services to the edge network, is the network in which the multimedia services are originated and implemented utilizing SIP. The edge network includes those devices that enable a user to receive the multimedia services originated by the core SIP network, such as switches, routers, and application software. Accordingly, the core SIP network includes a core SIP proxy for routing multiple (usually on the order of thousands) SIP messages to network elements connected to either the core or edge network for receipt by users. These network elements may be any communications equipment or software capable of providing SIP support or services to the user, such as Microsoft Windows Messenger or I Chat AV from Apple Computer.

With the conventional SIP-enabled systems, the edge network typically includes a multimedia terminal adapter (MTA) to which client devices such as mobile phones, computers and the like are directly coupled for receiving the multimedia services via SIP. Accordingly, the client devices which are integrated with the edge network enable the user to communicate, transfer and receive data using SIP. With these systems, however, the client devices are able to communicate via SIP so long as these devices are directly connected to the edge network. Particularly, such examples of the conventional systems include an internet protocol-private branch exchange (IP-PBX) device that has a SIP proxy integrated therein. With such a system, the user may utilize SIP so long as the user's client device (e.g., computer) is directly coupled to the IP-PBX device. As such, the user is unable to utilize the multimedia services via SIP if and when the client device is not directly connected to the edge network (also referred to as being inside the edge network). As such, there exists a need for a SIP-enabled system that enables the user to utilize his/her multimedia services via SIP irrespective of whether the user's client device is inside or outside of the edge network.

The present invention was conceived in view of these and other disadvantages of conventional SIP-enabled systems.

SUMMARY OF THE INVENTION

The present invention includes a system and method for providing multimedia services utilizing a signaling protocol such as Session Initiated Protocol (SIP) through the use of a local access network. The present invention provides the multimedia services irrespective of whether the user is using a client device that is internal to a local access network or a remote access network. The method includes providing a local proxy having an internet protocol (IP) address, wherein the local proxy is integrated with the local access network. The method further includes providing a client device having a signaling protocol client, wherein the client device is coupled to a remote access network that is external to the local access network. Additionally, the client device initiates or establishes the multimedia session by accessing the IP address of the local proxy. In one embodiment, the multimedia session includes a SIP session.

A communications system is disclosed, which is capable of providing the SIP enabled multimedia services, via the local access network. This system includes a local proxy having an internet protocol (IP) address, wherein the local proxy is integrated with the local access network. The system further includes at least one client device having the signaling protocol client and being configured to initiate or establish the multimedia session by accessing the IP address of the local proxy. Furthermore, the client device is configured to initiate the multimedia session irrespective of whether the client device is internal or external to the local access network.

The above embodiments and other embodiments, features, and advantages of the present invention are readily apparent from the following detailed description of the best mode for carrying out the invention when taken in connection with the accompanying drawings.

BRIEF DESCRIPTION OF THE DRAWINGS

The features of the present invention which are believed to be novel are set forth with particularity in the appended claims. The present invention, both as to its organization and manner of operation, together with, further objects and advantages thereof, may be best understood with reference to the following description, taken in connection with the accompanying drawings in which:

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular proponents. Therefore, specific functional details disclosed herein are not to be interpreted as limiting, but merely as a representative basis for the claims and/or as a representative basis for teaching one skilled in the art to variously employ in the present invention.

Figure 1:
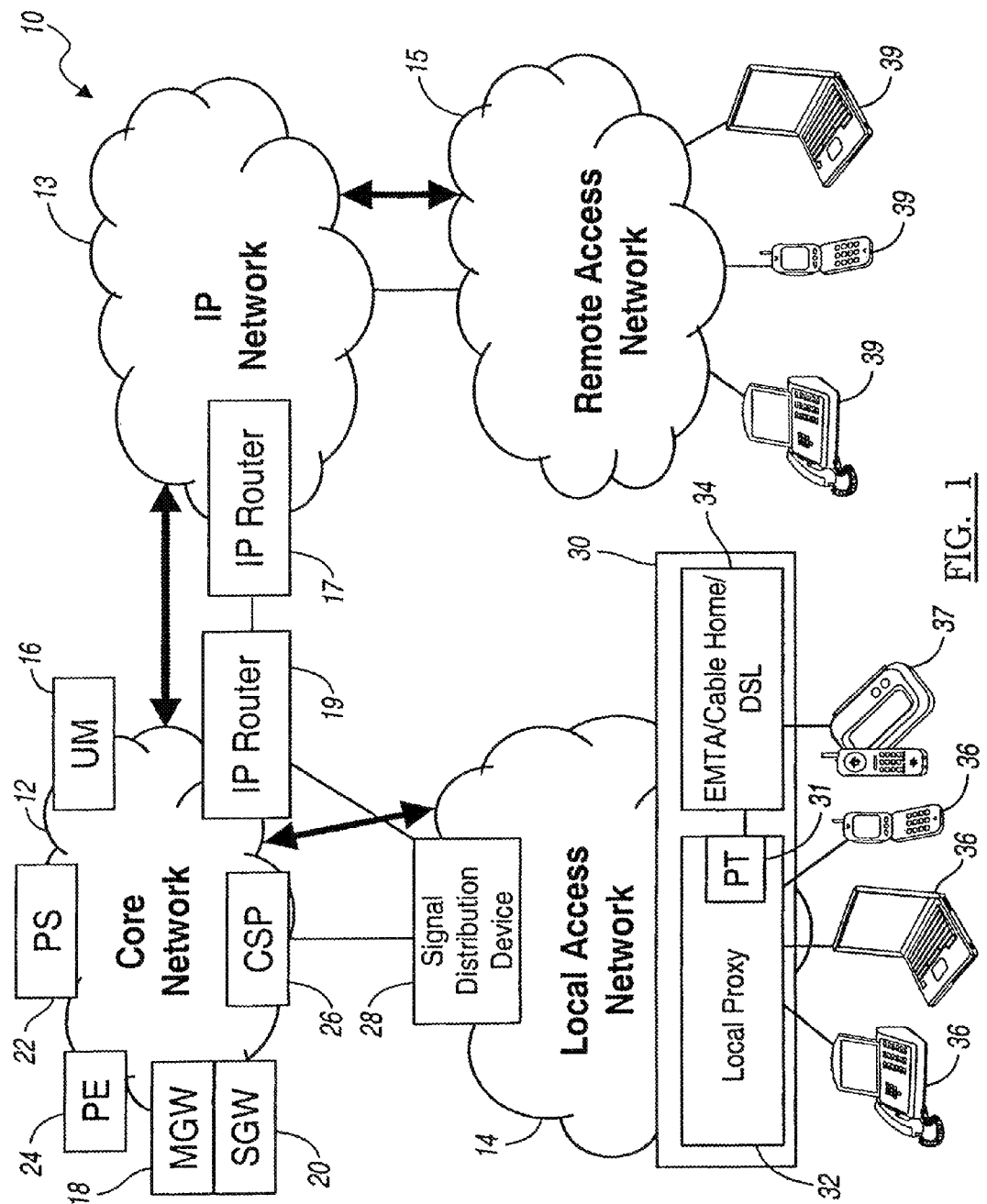
FIG. 1 depicts a communications system diagram that is configured to provide multimedia services through the use of a signaling protocol such as a Session Initiation Protocol (SIP) in accordance with an embodiment of the present invention.

Now, referring to FIG. 1, a communications system 10 is illustrated that is capable of providing multimedia services to a user through the use of a session initiation protocol (SIP). Although one embodiment of the present invention utilizes SIP, it is also recognized that virtually any suitable peer-topeer or client-server based signaling protocol may be appropriate for initiating and maintaining a multimedia service session over a packet network. In another embodiment, the signaling protocol utilized by communications system 10 may be a real time streaming protocol (RTSP). The RTSP is a protocol for use in streaming media systems which allows a client to remotely control a streaming media server, issuing VCR-like commands such as "play" and "pause", and allowing time-based access to files on a server. Information pertaining to the RTSP is available at http://www.ietf.org, and is incorporated herein by reference in its entirety.

Communications system 10 includes a session initiation protocol/internet protocol (SIP/IP) core network 12, a public Internet protocol (IP) network 13, a local access network 14, and a remote access network 15. In one embodiment, communications within communications system 10 may occur over fiber optic, copper, or wireless communication lines. Core network 12 may be embodied as an IP multimedia subsystem (IMS) and configured to provide SIP and IP services to the user. It is also recognized that the multimedia services provided through the use of core network 12 and local access network 14 include, but are not limited to voice over IP, instant messaging, video sharing/streaming, and chat services.

Communications system 10 enables the user to receive multimedia services irrespective of whether the user is internal or external to core network 12 and local access network 14. In one aspect, the use of the term "internal" includes, but is not limited to a client device that is connected to a network which is within the user's service provider network. Additionally, the term "external" may include, but is not limited to, the client device being connected to a network that is outside of the user's service provider network. Nevertheless, core network 12 may include a plurality of core application network elements. The core application network elements may include a unified messaging application 16, a media gateway 18, a signaling gateway 20, a policy server 22, and a presence engine 24.

Unified messaging application 16 supports a unified messaging system thereby enabling voice mail, email, and faxes to be received, stored and retrieved from a common system. Media gateway 18 is configured to transform media streams from one protocol to another protocol. Media gateway 18 also acts as a translation unit between disparate telecommunications networks such as a public-switch telephone network (PSTN), radio access networks, or a private branch exchange (PBX). Signaling gateway 20 is adapted to transform signals that leave core network 12 into a compatible form for other adjacent networks. Signaling gateway 20 is also configured to translate signaling messages between one medium (e.g., IP), and another medium (e.g., PSTN). Policy server 22 is a server that maintains policies for reference by and decision over client routers and switches. As recognized by one of ordinary skill, a policy may be any rule that determines the use of resources within the network. Presence engine 24 may enable the storage and management of the connection status of users, their devices and their capabilities. It is recognized that core network 12 may include all, some or none of the core application network elements without departing from the scope of the present invention. Additionally, other embodiments of the network elements may include any communications devices capable of providing SIP support or services to the user.

Core network 12 further includes a core SIP proxy 26 and an IP router 19. Core SIP proxy 26 is configured to receive signals and/or data, from local access network 14 and route SIP enabled messages received from local access network 14 to the appropriate network elements. Routing of SIP enabled messages to the network elements may occur via IP router 19. IP router 19 is also configured to forward data to other networks, such as public IP network 13 and local access network 14.

As described above, core network 12 is configured to provide multimedia services to local access network 14 via SIP. However, in other embodiments, core network 12 is capable of providing multimedia services utilizing other signaling protocols without departing from the scope of the invention. In either embodiment, local access network 14 includes a signal distribution device 28. Signal distribution device 28 may be a cable modem termination system (CMTS) or alternatively a digital subscriber line access multiplexer (DSL/AM). Accordingly, in the context of a cable network, the signal distribution device 28 may be located within a headend of the cable service provider. The CMTS embodiment of signal distribution device 28 is configured to exchange digital signals with cable modems that are connected to the cable network.

Local access network 14 may be a hybrid fiber coax network or a DSL access network. Local access network 14 also has integrated therewith, a local proxy 32. In one embodiment, local proxy 32 is a software application that resides on a server within local access network 14 that is operable with communications system 10. Local proxy 32 enables the user to remotely access multimedia services via a protocol such as SIP. As such, local proxy 32 is configured to have an internet protocol (IP) address wherein the user may receive multimedia services by accessing the IP address of local proxy 32. In one aspect of the, present invention, the IP address of local proxy 32 is a fully qualified domain name (FQDN). Furthermore, local proxy 32 may be configured to be either stateful or stateless. In the stateful embodiment of local proxy 32, local proxy 32 may operate as a back-to-back user agent (B2BUA). A B2BUA may be a logical entity that receives a request and processes it as a user agent server and also transmits the request as a user agent client. Additionally, in the stateful embodiment of local proxy 32, local proxy 32 may be capable of storing information pertaining to prior sessions, data requests and/or commands. Where local proxy 32 is stateless, information pertaining to prior sessions, data requests and/or commands may not be maintained in memory.

As shown, local proxy 32 is operable with client devices 36. Client devices 36 may include, but are not limited to cellular phones, personal digital assistants (PDA), and/or computers. Client devices 36 are configured to have a signaling protocol client such as an SIP client. The signaling protocol client may be a software application that is operable with client devices 36 for accessing multimedia services originated by core network 12. In the embodiment shown, client devices 36 may be considered directly coupled to (or internal to) core network 12 and local access network 14. Thus, calls and/or sessions that are initiated, received, or maintained by client devices 36 may be considered "in-network" multimedia sessions and/or calls. Additionally, as described hereinafter, the present invention enables multimedia sessions (i.e., SIP enabled sessions) and/or calls that are initiated or received by client devices 39, which are external or remote to core network 12 and local access network 14.

In an alternative embodiment, the local proxy 32 may be packaged, either integrally or discretely, with an embedded multimedia terminal adapter (EMTA) 34, collectively referred to as a SIP device 30. In one embodiment, an EMTA may be a multimedia terminal adapter having a cable modem. As such, SIP device 30 may be a single module having local proxy 32 and EMTA 34, which may be located within the user's home or office.

In one aspect, SIP proxy interface 32 and EMTA 34 are coupled in a manner that allows a networked-based call signaling (NCS) type client device (i.e., client device 37), which is operable with an NCS protocol, to respond to SIP calls. Enabling the NCS type client device 37 to respond to SIP calls may occur via a protocol translator 31. For example, when client devices 36 receive or initiate a SIP call, protocol translator 31 translates the SIP call into a protocol (e.g., NCS protocol) that is compatible with client device 37. Thus, client device 37 may, for instance, ring in response to the SIP call originally received by client devices 36.

EMTA 34 may also enable media manipulation such as sampling, encoding, decoding, and encapsulation. Additionally, SIP device 30 may include a cable home device coupled to local proxy 32 instead of the EMTA. Alternative embodiments may include local proxy 32 being coupled to a digital subscriber line modem versus an EMTA.

Local access network 14 and core network 12 may communicate with remote access network 15 through the use of an IP router 17 that is operable with public IP network 13. Remote access network 15 is representative of virtually any network that is external or remote to core network 12 and local access network 14. Depending upon the particular implementation, remote access network 15 may be a cable network, a DSL network, a wireless local area network (WLAN) or the like. Accordingly, remote access network 15 may have a plurality of client devices 39 that are operable therewith for enabling the user to access the multimedia services (i.e., SIP enabled services) although client devices 39 are external to core network 12 and/or local access network 14. Client devices 39 may be configured to have a signaling protocol client that is compatible with the particular signaling protocol (e.g., SIP) utilized by communications system 10. In one embodiment the signaling protocol may be embodied as a software application for accessing multimedia services originated by core network 12.

Now, a description of a remote call will be provided wherein a protocol, such as SIP, is utilized. It is recognized that communications system 10 is configured to facilitate the transmission of signals, data, voice, and the like. Thus, the term "message" as stated herein refers to any type of signal transmitted, received, or generated by communications system 10.

As described in the foregoing, communications system 10 enables a user to receive multimedia services utilizing a signaling protocol such as SIP irrespective of whether the user's client device is internal or external to core network 12 or local access network 14. Accordingly, in the event that the client devices are external to local access network 14 and core network 12 (i.e., client devices 39 being connected to remote access network 15), the user may initiate the multimedia session or IP session by accessing the IP address of local proxy 32 via IP network 13. It is recognized that although IP network 13 represents a public IP network, alternative embodiments may include private data networks without departing from the scope of the present invention. In either embodiment, once the user accesses the IP address of local proxy 32, an authentication and registration procedure begins.

Accordingly, client devices 39 register with local proxy 32 by sending a SIP register message to the IP address of local proxy 32. Upon receipt of the SIP register message by local proxy 32, client devices 39 are authenticated and enabled to utilize the multimedia services supported by core network 12. In one embodiment, client devices 39 may obtain an IP address as part of a dynamic host configuration protocol (DHCP) mechanism in remote access network 15. Furthermore client devices 39 communicate with local proxy 32 using a signaling protocol such as SIP. Additionally, in the event core network 12 receives messages for client devices 39, core SIP proxy 26 may forward those messages to local proxy 32 for receipt by the user. Once the call signaling is established, the user may send and receive media through SIP device 30 (e.g., EMTA 34) irrespective of whether the client devices (e.g., client devices 36 and/or 39) are internal or external to local access network 14.

Figure 2A:
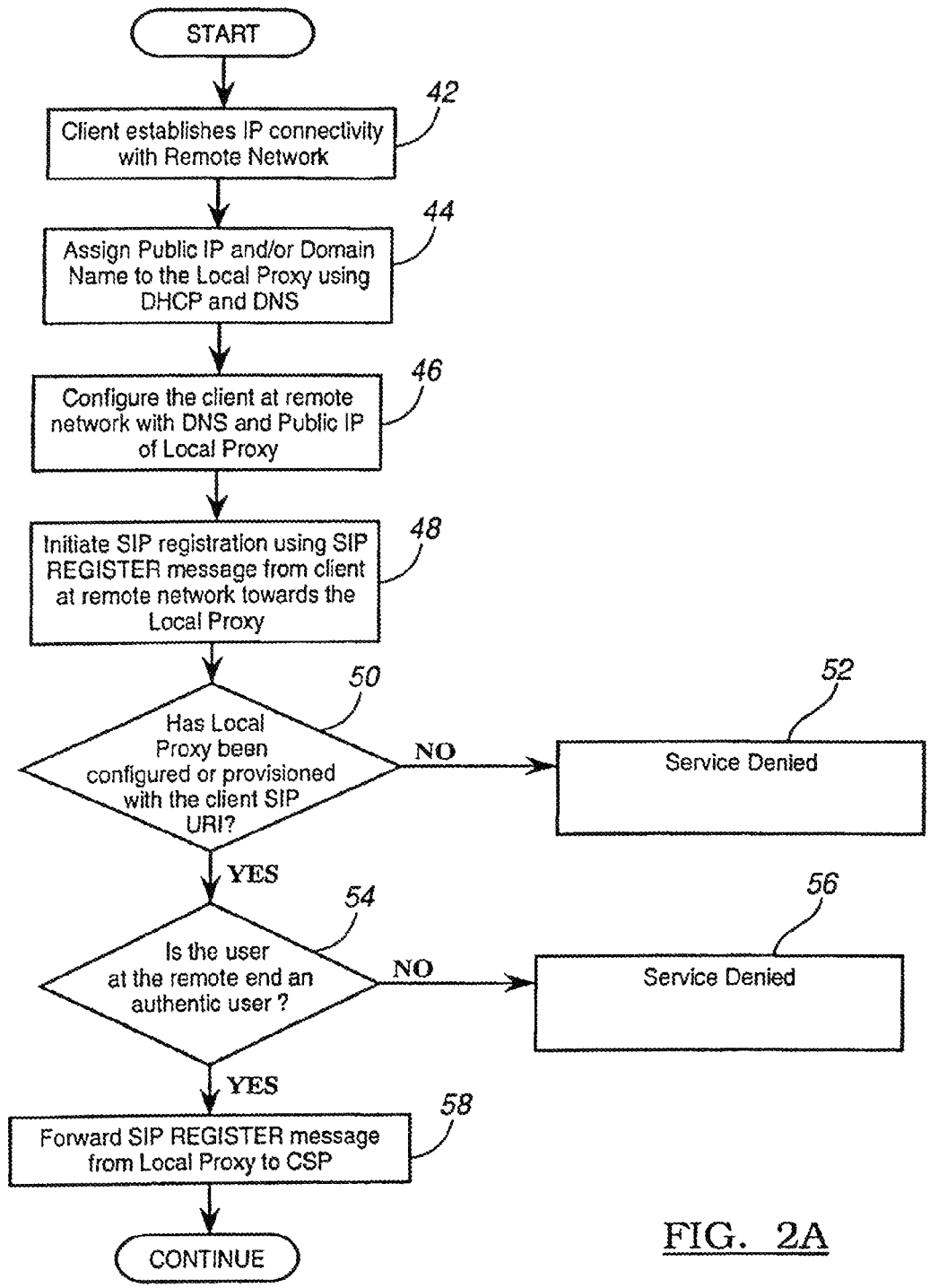
FIGS. 2A and 2B illustrate a flow diagram for a method of providing multimedia services through the use of the SIP in accordance with an embodiment of the present invention.
Figure 2B:
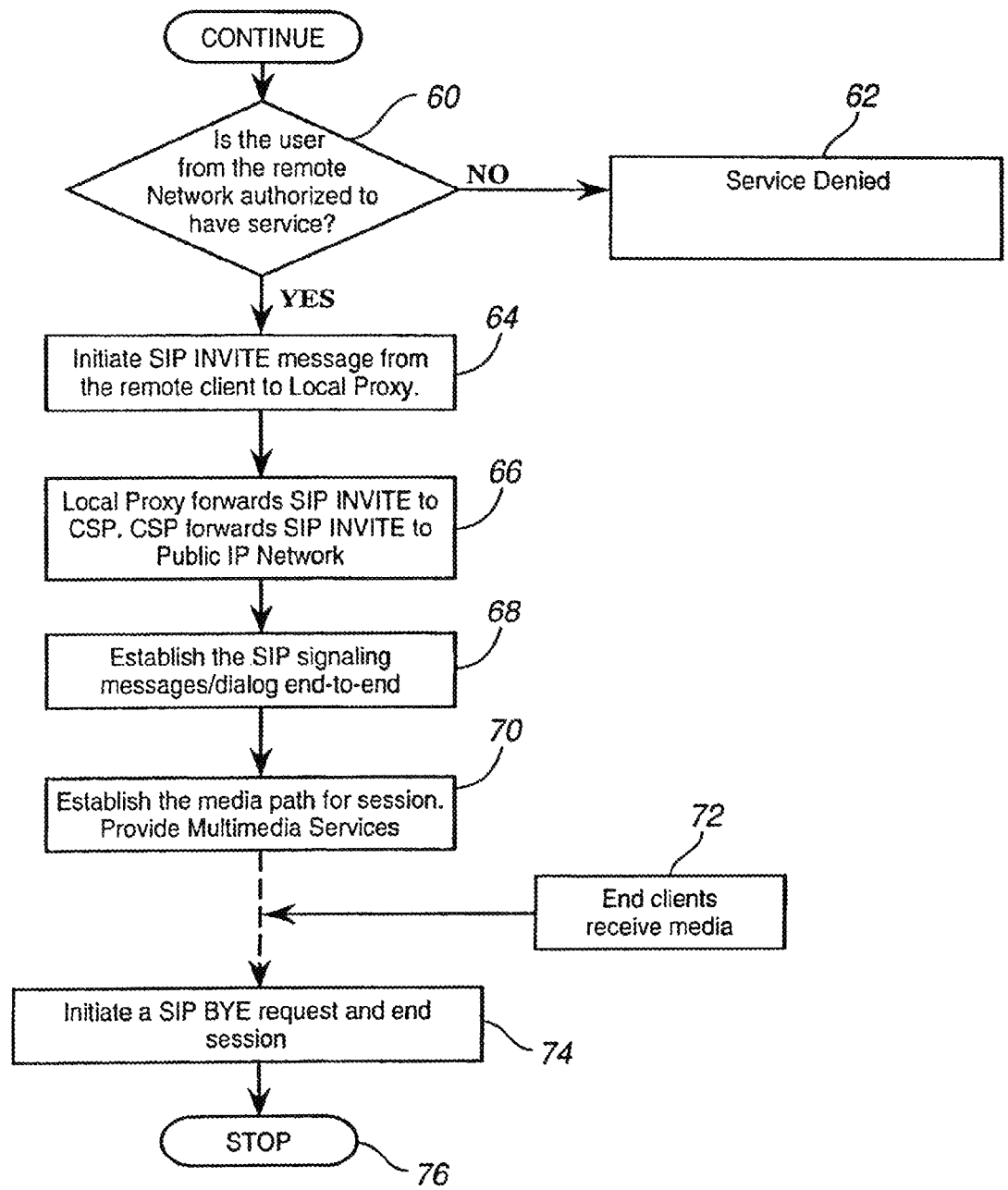

Now referring to FIGS. 1, 2A and 2B, a method for initiating, maintaining, and terminating a SIP enabled call and/or session from external client device 39 is illustrated. The arrows shown in FIG. 1 illustrate the flow of signals between SIP/IP core 12, IP network 13, local access network 14, and remote access network 15, when a user begins a (e.g., SIP enabled) session via client devices 39. Specifically, referring to FIG. 2A, the present invention comprises the following steps. Client devices 39 establish an IP connection with the external/remote access network 15 via IP network 13 (block 42). A public IP address and/or a domain name is assigned to the local proxy (block 44). In one embodiment, the assignment of the IP address and/or domain name is provided through the use of a DHCP mechanism and a domain name server (DNS). In one aspect, the DHCP is an internet protocol for automating the configuration of client devices that use transmission control protocol/internet protocol (TCP/IP).

The method configures client devices 39 that are connected to the remote access network with the domain name server and the public IP address of local proxy 32 (block 46). The SIP registration is initiated as depicted by block 48. Accordingly, a SIP register message is transmitted from the client device to local proxy 32. The method determines whether local proxy 32 has been configured or provisioned with a client SIP uniform resource identifier (URI) (block 50). If local proxy 32 has not been configured with the client SIP URI, service is denied (block 52). In one embodiment, the user may receive a response, such as a SIP 403 response, indicating, that the server cannot provide the requested service. If local proxy 32 has been configured with the client SIP URI the method determines whether the user at client devices 39 is an authentic user (block 54). If the method determines that the user is not authentic, service is denied (block 56). In one aspect, the method enables generation of a response indicating that the server cannot provide the requested service.

In the event that the user is deemed authentic, the SIP register message is forwarded from local proxy 32 to core SIP proxy 26, which is communicative with the core network 12 (block 58). Accordingly, the method determines whether the user is authorized to receive the SIP enabled services (block 60). If the user is not authorized, the user is denied service (block 62). In one embodiment, the user may receive a response indicating that the request is unauthorized. If the user is determined by communications system 10 to be authorized, the client devices 39 initiate a SIP invite message that is forwarded to local proxy 32 (block 64).

Local proxy 32 forwards the SIP invite message to the core SIP proxy 26 (block 66). As such, core SIP proxy 26 forwards the SIP invite message to IP network 13 (block 66). Thus, the method establishes the SIP signaling messages/dialogue from end to end (i.e., core network 12 to remote access network 15) (block 68). A media path for the SIP session is established enabling the use of the multimedia services (block 70). Accordingly, the user, utilizing client devices 39, may receive the media services (block 72). When the user decides to terminate the SIP session, the user may initiate a SIP BYE request and end the session via client devices 39.

Accordingly, once the SIP BYE request is received by local proxy 32, the session is ended (block 74) and the method can end (block 76).

As described in the foregoing, the embodiments described herein enable multimedia sessions (e.g., SIP enabled sessions) and/or calls through the use of a client device irrespective of whether the client device is connected to the core network, the local access network, or the remote access network. Although the foregoing description is directed to SIP, it is recognized that other signaling protocols may be utilized, including, but not limited to, the RTSP. While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   establishing a communication session with a device, wherein the device is located within a first network that is external to a second network;
   authenticating the device at an authentication element, wherein the authentication element is located within a third network that is external to the first network and the second network;
   authorizing a user of the device at the second network at a request of the authentication element; and
   providing a service to the device from the second network without requiring that the service be routed through the authentication element.

2. The method of claim 1, wherein the device is compatible with a signaling protocol.

3. The method of claim 1, wherein the authentication element comprises computer-readable instructions.

4. The method of claim 1, wherein the first network is a remote access network.

5. The method of claim 1, wherein the second network is a core network configured to transmit a multimedia service.

6. The method of claim 1, wherein the authentication element is associated with an addressable identifier.

7. The method of claim 1, wherein the authentication element is associated with an internet protocol (IP) address.

8. A communication system comprising:
   a computing device comprising an authentication element associated with an internet protocol (IP) address and configured to manage access to services;
   an authorization element within a core network, the authorization element configured to manage authorization of one or more users of one or more devices, wherein the authentication element is external to the core network;
   wherein the authentication element is further configured to authenticate at least one of the one or more devices and request authorization for the at least one authenticated device from the authorization element; and
   wherein a service is provided to the at least one authenticated device from the core network without requiring that the service be routed through the authentication element.

9. The system of claim 8, wherein the authentication element is further configured to relay messages according to a signaling protocol from the at least one authenticated device to a device of the core network.

10. The system of claim 8, wherein the authenticated device is compatible with a signaling protocol.

11. The system of claim 8, wherein the authentication element comprises computer-readable instructions.

12. A method comprising:
    receiving a request from a device through a first network that is external to a second network and a third network, wherein the device is located within the second network that is external to the first network;
    authenticating the device at an authentication element, wherein the authentication element is external to the third network;
    authorizing a user of the device at the third network at the request of the authentication element; and
    transmitting data to the authorized user of the device from the third network without requiring that the data be routed through the authentication element.

13. The method of claim 12, wherein the device is compatible with a signaling protocol.

14. The method of claim 12, wherein the authentication element comprises computer-readable instructions.

15. The method of claim 12, wherein the first network is a public network.

16. The method of claim 12, wherein the second network is a remote access network.

17. The method of claim 12, wherein the third network is a core network configured to transmit data relating to one or more multimedia services.

18. The method of claim 1, further comprising providing multimedia services to the device from the second network without requiring that the multimedia services be routed through the third network.

19. The method of claim 1, wherein the device is a client.

20. The method of claim 12, wherein the device is a client.

* * * * *